United States Patent [19]
Page

[11] Patent Number: 5,469,597
[45] Date of Patent: Nov. 28, 1995

[54] CLOSED LOOP SURFACE CLEANING SYSTEM

[75] Inventor: Thomas A. Page, Houston, Tex.

[73] Assignee: Hydrowash Recycling Systems, Inc., Houston, Tex.

[21] Appl. No.: 147,942

[22] Filed: Nov. 4, 1993

[51] Int. Cl.[6] ................................................ A47L 5/34
[52] U.S. Cl. .................. 15/321; 15/340.1; 15/353
[58] Field of Search ............................ 15/302, 320, 321, 15/353

[56] References Cited

U.S. PATENT DOCUMENTS

| | | | |
|---|---|---|---|
| 2,909,800 | 10/1959 | Grindle et al. ........................ | 15/321 |
| 3,384,239 | 5/1968 | Berardi . | |
| 3,605,169 | 9/1971 | Howerin et al. ...................... | 15/321 |
| 3,959,010 | 5/1976 | Thompson et al. .................. | 15/320 X |
| 4,104,164 | 8/1978 | Chelton . | |
| 4,374,028 | 2/1983 | Medina . | |
| 4,377,018 | 3/1983 | Cain .................................... | 15/321 X |
| 4,530,131 | 7/1985 | Zell et al. ............................. | 15/321 |
| 4,676,908 | 6/1987 | Ciepiela et al. . | |
| 5,011,609 | 4/1991 | Fink . | |
| 5,016,314 | 5/1991 | Green et al. ......................... | 15/321 X |
| 5,102,503 | 4/1992 | Silinski et al. . | |
| 5,114,574 | 5/1992 | Barry .................................... | 15/321 X |
| 5,151,194 | 9/1992 | Simpson et al. . | |
| 5,178,769 | 1/1993 | Simpson et al. . | |
| 5,224,236 | 7/1993 | Sallquist ............................... | 15/321 |

*Primary Examiner*—Chris K. Moore
*Attorney, Agent, or Firm*—Mark A. Oathout

[57] ABSTRACT

The present invention relates generally to an environmentally sensitive cleaning system, and more specifically relates to a closed loop high pressure cleaning system for cleaning surfaces without dislodging contaminants into the storm water drain or to the environment. The present invention is directed to a method and apparatus that satisfies this need. The apparatus comprises an established volume of fluid sufficient to circulate through the system, a pump to pressure the fluid to a cleaning head, a vacuum system to return the contaminated fluid to the system, and a filter means to remove the contaminants from the fluid so that clean fluid can be reintroduced to the cleaning head. The method comprises the steps of increasing the pressure of a fixed volume of fluid in a closed-loop system, jetting or blasting the surface with the pressurized fluid, vacuuming the blasted fluid into the system, and removing the contaminants from the fluid.

19 Claims, 4 Drawing Sheets

CLOSED LOOP SURFACE CLEANING SYSTEM

BACKGROUND OF THE INVENTION

This invention relates to an environmentally sensitive closed-loop pressure cleaning system for cleaning surfaces.

Maintaining a clean and adequate supply of fresh water is essential to society. In many metropolitan areas, even in smaller towns, and industrial areas, the goal of an adequate supply of fresh water is seriously challenged by both higher demands for water and by the large amounts of contaminants found in waste water systems. Today many municipal and industrial waste water treatment systems operate at near peak capacity. Therefore, efforts are made to reduce the volume of water that passes through these waste water treatment systems, and to also reduce the pollutants that are introduced into these systems. Federal, State and Local Governments have attempted to improve the fresh water supply and capacity of waste water treatment systems by promulgating laws and regulations to limit the type and amount of contaminated water that enters water treatment systems via storm sewers. For example, many such laws prohibit persons from discharging water containing any hydrocarbons or other contaminants into public storm sewers. E.g., Texas Water Commission Rule 26.121; Houston City Code §47-33. These rules and regulations are applicable to all persons, including operators of car washes, service stations, and other small businesses.

Efforts to reduce storm sewer drainage volume and the amount of pollutants are particularly effective when cleaning large surface areas, such as factory floors, aircraft hangars, garage shop floors, work shop and machine shop floors, pedestrian walkways, automobile parking lots, helicopter pads, and sports stadiums. Cleaning such large surface areas can require large volumes of water, and in cleaning such surfaces, the contaminants which dislodge from the surface, together with the detergents or other cleaning agents, are discharged to the environment and the natural water supply. Additionally, when these surfaces are cleaned much of the water used may be lost through evaporation.

In order to reduce the volume of waste water and the amount of pollutants, and to comply with Federal, State and Local regulations, the industry frequently performs "pre-treatment" of waste water or "recycling" of waste water. Many of these systems operate with a high pressure sprayer to clean machinery, surfaces or other equipment. The contaminated water gravity drains from the equipment or surface into a sump, or other containment area. The water is then treated by filters, chemicals and/or microorganisms before releasing the water to the waste water treatment system. These systems utilize large pieces of equipment and for this reason and because a sump is utilized, these systems are designed to clean a dedicated area. Some systems operate as "closed loop" systems wherein the water is never released for drainage to waste water treatment plants, but rather is regenerated within the system itself. These systems comprise a finite volume of water or cleaning fluid, and occasionally fluid is added to "make-up" fluid loss due to evaporation or adsorption into the equipment or surface.

However, many industries find prior art systems problematic for complying with storm drain regulations because of the expense in purchasing and maintaining a "pre-treatment" waste water system. Also, because of the large number of such surfaces, cleaning these surfaces is both physically and economically difficult with cleaning systems that are dedicated to a specific site or surface area.

For the foregoing reasons, there is a need for a surface cleaning system which is portable, closed-loop, and operates to minimize the amount of water which is released to the environment or waste water drain system. There is also a need for a system which reduces the amount of water that escapes through evaporation, and which eliminates the amount of pollutants entering the municipal or industrial waste water system.

SUMMARY OF THE INVENTION

The present invention relates generally to an environmentally sensitive cleaning system, and more specifically relates to a closed loop high pressure cleaning system for cleaning surfaces that minimizes water usage and contains contaminants before they enter the storm water drain system. The present invention is directed to a method and apparatus that satisfies this need. The apparatus comprises an established volume of fluid sufficient to circulate through the system, a pump to pressure the fluid to a cleaning head, a vacuum system to return the contaminated fluid to the system, and a filter means to remove the contaminants from the fluid so that clean fluid can be reintroduced to the cleaning head. The method comprises the steps of increasing the pressure of a fixed volume of fluid in a closed-loop system, jetting or blasting the surface with the pressurized fluid, vacuuming the blasted fluid into the system, and removing the contaminants from the fluid.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENT

Figure 1:
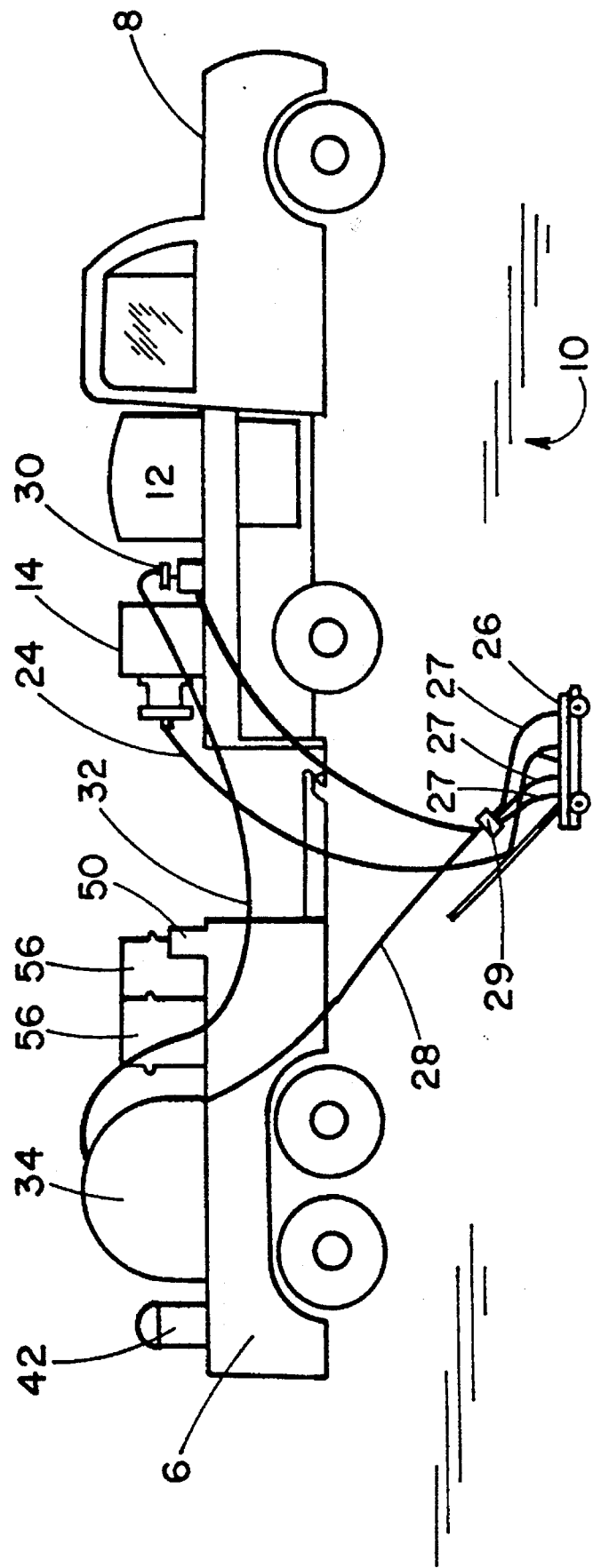
FIG. 1 is a elevational view of the invention as it is used in the environment.
Figure 2:
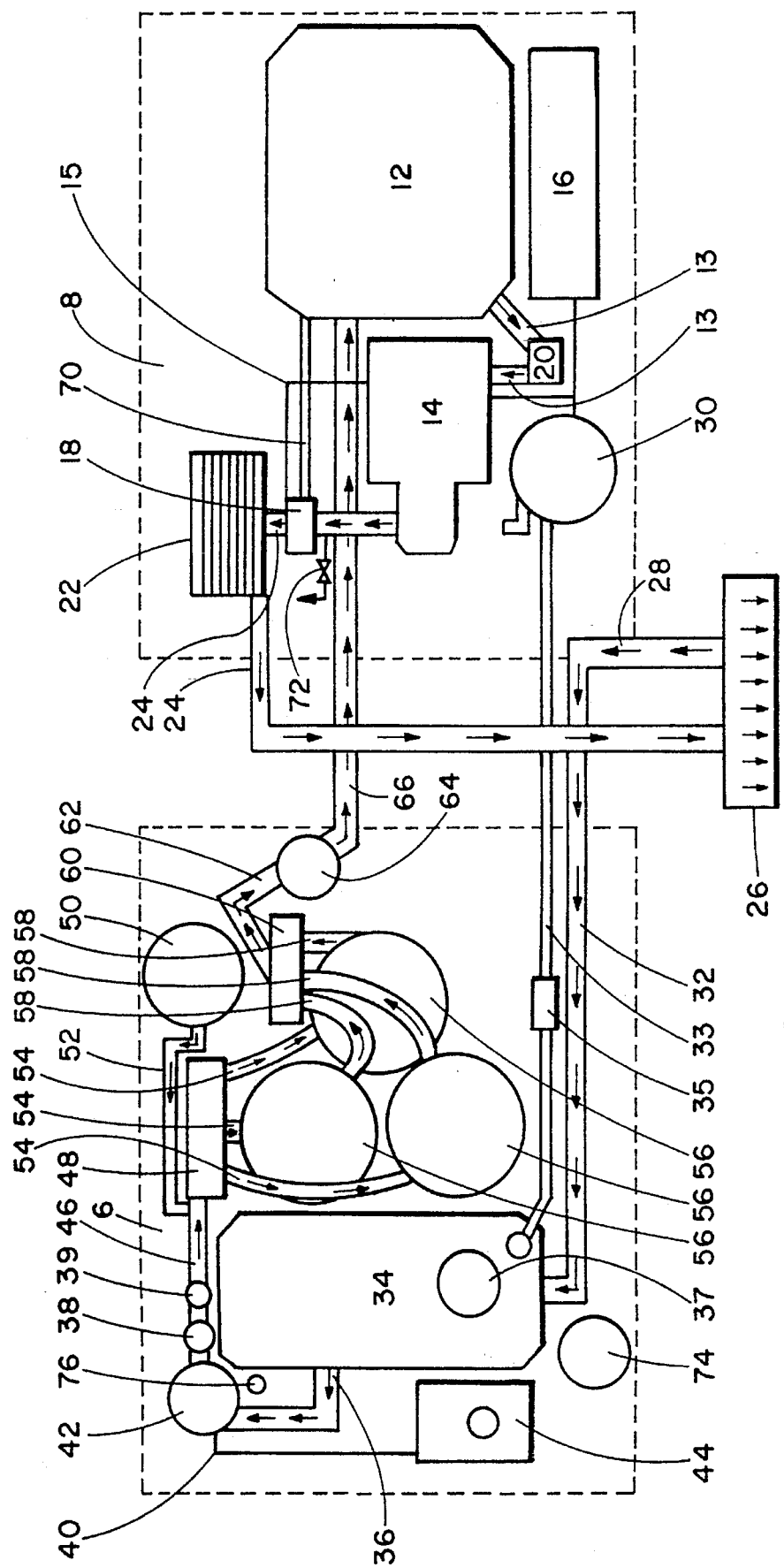
FIG. 2 is a flow diagram of the preferred closed loop surface cleaning system.

FIGS. 1 and 2 show the system mounted on truck 8 and trailer 6 in order to provide a portable system that can be used in many different locations. FIG. 2 shows the detailed flow diagram of the closed loop fluid cleaning system. Clean water is stored in water tank 12. Preferably, water tank 12 has a 200 gallon capacity. Water tank 12 functions not only to store substantially non-contaminated water, but also to provide a constant source of water to high pressure water jetting pump 14. Fluids, discharge clean water tank 12 through the tank's discharge port and pass through filter 20. Filter 20 is preferably a No. 80 mesh wire filter, and operates to protect high pressure water jetting pump 14 from any particles entrained in the water.

High pressure water jetting pump 14 creates a pressure differential to suction from clean water line 13 through filter 20 and increases the pressure up to about 4,500 psig of the water introduced to the high pressure fluid hose 24. High pressure fluid hose 24 transports the clean water directly from high pressure water jetting pump 14 to clean water control panel 18 with the option of recycling directly to the tank 12 via recycle line 70 or sending the clean water through the hose reel 22 to the cleaning head 26. On the clean water control panel 18 there exists a throttle and an on-off switch (not shown) for the vacuum pump 30 which is coupled directly to a diesel motor which provides power to high pressure water jetting pump 14 and vacuum pump 30. The throttle mechanism controls the rotation of the diesel motor which is coupled to both pumps. High pressure water jetting pump 14 is a positive displacement pump and preferably is a Harbon® Model No. 820 high pressure water jet pump, which is capable of pumping fluid at a rate of 9 gallons per minute at 5,000 psig. High pressure water jetting pump 14 is operated by control panel 18 through control means 15. Safety valve 72 is attached to high pressure fluid line 24 between jetting pump 14 and control panel 18 and functions to protect the integrity of the surface to be cleaned. For example, with asphalt, the throttle on control panel 18 is used to ensure that the pump 14 discharge pressure does not exceed about 1,500 psig in order to protect the integrity of the asphalt. For cleaning concrete or cement, the pressure can be as high as 5,000 or 5,500 psig.

Figure 4A:
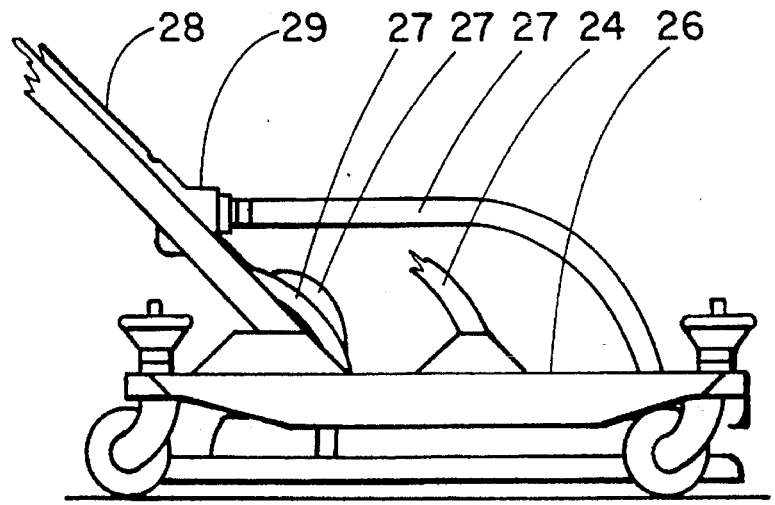
FIG. 4a is a side view of a surface cleaning head used in the closed loop system.
Figure 4B:
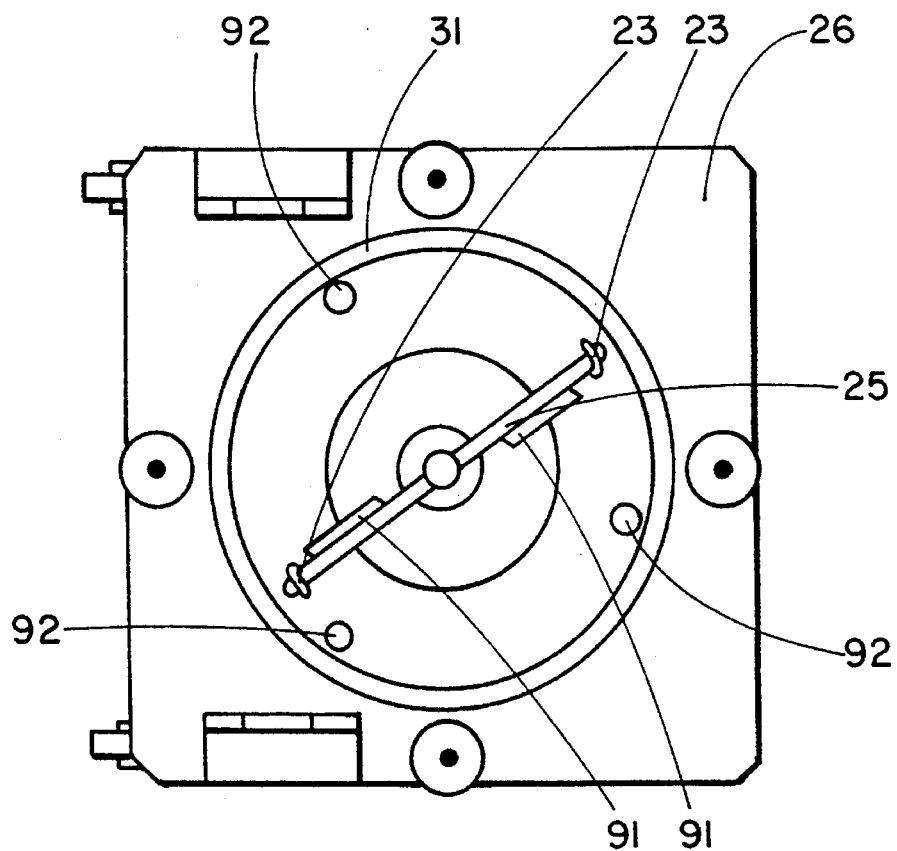
FIG. 4b is a bottom view of the surface cleaning head used in the closed loop system.

High pressure fluid line 24 carries the pressurized fluid through hose reel 22 to cleaning head 26. It is contemplated that cleaning head 26 is a device modified from the commercially available HOVERVAC, made by Harben, Inc. of Cumming, Ga. The modifications include changing the fluid retrieval system to operate by use of vacuum pump 30, and the inclusion of a pressure relief valve (not shown). Other modifications include the use of an improved seal 31, by using graphite-based material instead of rubber. In operation, cleaning head 26 cleans a width of about sixteen inches on surface 10. In another embodiment, a modified HOVERVAC is not utilized; rather a cleaning head with a cleaning path width of over thirty inches, is used to allow for faster cleaning of surface 10. Cleaning head 26 is a rotary floor and surface cleaner with unique dual jetting and suction capacity. Referring to FIG. 1 and FIG. 4a, high pressure water line 24 is introduced into cleaning head 26 at the center of the head. The pressurized fluid enters cleaning head 26 and is introduced to surface 10 to be cleaned via pressure jets 23 on opposite ends of a cleaning propeller 25 (see FIG. 4b). The propeller 25 is powered by the pressurized fluid. Also included in cleaning head 26 are other water ports to lubricate the rotational mechanism of the propeller. The cleaning jets are proximal to surface 10. The propeller 25 also contains fins 91 which provide lift to decrease the friction between cleaning head 26 and surface 10. A rubber seal 31 is also included on cleaning head 26 in order to contain the water as it is jetted and suctioned. Suction ports 92 are provided to recover jetted fluid and contaminants.

The water leaves surface 10 through suction ports 92 and split vacuum lines 27, and carries with it the contaminants from surface 10. These contaminants consist of suspended particles, colloidal particles and dissolved matter, usually of hydrocarbon content. Three split vacuum lines 27 are included to suction the water from surface 10 into single vacuum line 28. Vacuum lines 27 meet at manifold 29 and are combined into single vacuum line 28, which is directly attached to the intake port of contaminated water tank 34. Contaminated water is moved from surface 10 through vacuum lines 27 by a drop in system pressure created by vacuum pump 30. Vacuum pump 30 may be a full powered rotary vein vacuum pump, which creates approximately fifteen inches of vacuum at 150 cubic feet per minute. In the preferred embodiment vacuum pump 30 is a commercially available ROOTS 33 R.A.I. Blower capable of moving 163 cubic feet per minute of vapor at fourteen inches of vacuum and 3600 rpm. Vacuum pump 30 takes suction from the top of contaminated water tank 34 via vacuum suction line 33 and discharges to atmosphere. Also provided in the vacuum system is a vacuum water scrubber 35, which serves to protect vacuum pump 30 from any water entrained in the vacuuming process. Also attached to the contaminated water vacuum tank 34 is a clean out valve on the bottom of the tank (not shown).

Also provided in the preferred embodiment is an additional waste fluid clean up tank 74 with a vacuum hose, powered by vacuum pump 30, attached to aid the system operator in cleaning the filters and recovering any fluid and contaminants associated with the job. Fluid continues down vacuum discharge line 32 and is released into contaminated water vacuum tank 34, which is on trailer 6. Contaminated water tank 34 also serves as a particulate drop out tank to remove solids prior to filtering contaminated water. This operation preserves downstream filter life.

Contaminated water tank 34 comprises a level sight gauge 76 and a clean-out opening 37. From contaminated water vacuum tank 34, the water travels through the tank's discharge port to contaminated water filter input line 36 to contaminated fluid pump 42. Contaminated fluid pump 42 is a centrifugal water pump which provides pressure to power the contaminated fluid through filter system 78, shown more specifically in FIG. 3. Contaminated fluid pump 42 is preferably diesel driven, in order to provide portability required in this closed loop system.

In another embodiment of the invention, the pressure needed to send the contaminated water through the filter system may be provided by a pump that is powered by the same motor that powers both the high pressure water jetting pump 14 and the vacuum pump 30. This operation will result in reduced emissions and less maintenance. Diesel tank 44, shown in FIG. 2, provides fuel to contaminated fluid pump 42.

Figure 3:
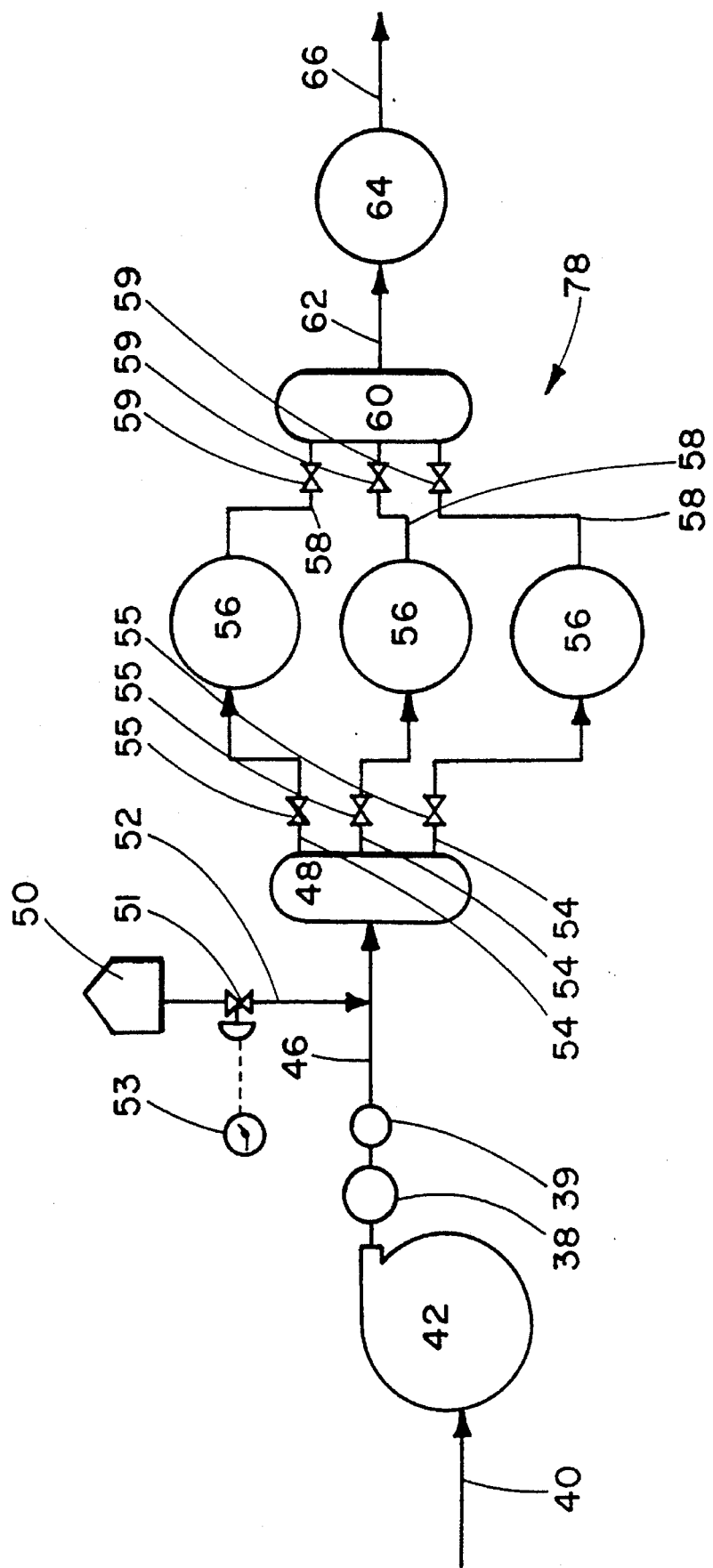
FIG. 3 is a detailed piping diagram of the filtration area within the closed loop surface cleaning system.

Referring to FIGS. 2 and 3, and particularly FIG. 3, contaminated fluid pump discharge line 46 transports fluid to a contaminated water bag filter system, comprising bag filters 38 and 39. In this system, contaminated water first passes the fluid through a fifty micron bag filter 38. The contaminated water then travels through ten micron bag filter 39. These filters are common bag filters which utilize replaceable fabric bags (polypropylene or some other material) specifically manufactured to the relative size needed. The bags on these filters are replaced in normal operation every twenty minutes to 1.5 hours, depending on the pressure drop across each bag. The pressure is measured by gauges (not shown) attached to each of the filters. Discharge line 46 then transports the fluid to manifold 48. Just upstream of manifold 48, microorganisms are supplied to the system from supply canister 50 via microorganism feed line 52 and microorganism feed valve 51. Microorganism feed valve 51 is a control valve which injects microorganisms at a predetermined rate by means of timer 53. It is presently contemplated that the best feed valve 51 is the commercially available anti-clogging injection feed nozzle manufactured by LMI-Milton Ray. The microbes that are added to the filter system 78, shown in FIG. 3, before manifold 48 upstream of the peat filters 56 include both aerobic and anaerobic bacteria. It is presently contemplated that the preferred microorganisms are ANABAC 50/50 supplied by Medina Laboratories of Hondo, Tex. Of course, any hydrocarbon degrading bacteria should suffice. The anaerobic bacteria are utilized so that hydrocarbons and other material build-up on the peat filters continues to be consumed by the bacteria even when the cleaning system is not in operation. Timer 53 is connected to supply canister 50 to feed microorganisms into the cleaning system at the valve manifold 48 to peat filters 56. Timer 53 allows for desired amounts of microorganisms and air to be inserted at precision rates. This oxygenation allows the aerobic bacteria to degrade significant amounts of hydrocarbons while the system is in operation.

Timer 53 can operate independent of the rest of the system because even when the cleaning system is down, microorganisms may be fed to peat filters 56 via manifold 48. Peat filters 56 are preferably filters embodying U.S. Pat. Nos. 5,151,194 and 5,178,769, both to Simpson et al. which contains sphagnum peat moss. Activated carbon is also added to peat filters 56 to control the pH of the fluid and to otherwise enhance contaminant removal as the fluid cycles through peat filters 56.

After microorganisms are added to the system, fluid travels into manifold 48 where manifold 48 splits the water stream into three equal components for introduction into filters 56. The microorganisms from supply canister 50 adhere to the peat moss and, over time, consume all hydrocarbons and other waste. Filter feed lines 54 each feed into a separate filter 56. It is critical that the stream be modified as it is introduced into filters 56, so as to provide the correct amount of fluid for the relative filter capacities. The closed-loop cleaning system preferably retains a capacity of 300 gallons, not all of which can pass through a single filter. Moreover feedblock valves 55 and filter discharge block valves 59 are provided in order to remove and/or replaces filter 56 during operation as needed. Manifold 60 combines three filter discharge lines 58 into a single discharge manifold line 62. In another embodiment, hydrocarbons may also be removed by means of an oil/water separation, sometimes referred to as a coalescer as well as other means for removing hydrocarbons, including ultrasound means.

The fluid is then cleaned again through clean fluid filter 64. Clean fluid filter 64 is a paper ten-micron filter, which functions to remove any peat sediment that may have discharged through the main filtration system.

The clean fluid passes through clean fluid filter 64 into clean fluid return line 66, where the fluid is returned to clean water tank 12 via tank 12's return port. The water repeatedly recycles through this system until the desired job is completed. Depending upon conditions, some fluid may be lost during the cleaning process. For example, on a hot day with a porous surface 10, perhaps up to 100 gallons may be lost in the system after approximately 6,000 to 9,000 gallons have been recycled and should be made tip after the job is completed. In other situations, in a non-porous environment and in cooler weather where little water will be evaporated, the system could lose less than 1 gallon during a full day of operation.

In order to minimize evaporation, it is important that as water is jetted onto surface 10 that it is immediately vacuumed and passed through the system. It is also contemplated that water may be used as the cleaning fluid or any other fluid, whether water-based or otherwise, may be utilized.

In practice, the present invention provides a quick and relatively inexpensive way to utilize a portable closed loop cleaning system with zero discharge. No disposal of fluid is required, and such operation avoids federal, state and local environmental law fines and violations.

The foregoing disclosure is sufficient to enable one of ordinary skill in the art to practice the present invention.

Further, the foregoing disclosure provides the best mode of practicing the present invention presently contemplated by the inventors. However, it will be appreciated by those of ordinary skill in the art having benefit of this disclosure that there are various modifications that may be made to the present invention without departing from the scope of the present invention.

What is claimed is:

1. A closed-loop pressure cleaning system for cleaning a surface, comprising:

a portable base;

an uncontaminated fluid storage tank mounted on the portable base wherein the uncontaminated fluid storage tank includes a return port and a discharge port;

a high pressure fluid jetting pump mounted on the portable base and having an inlet and an outlet wherein the inlet is connected by a clean water line to the discharge port of the uncontaminated fluid storage tank;

a surface cleaning head including a means for jetting fluid against the surface to be cleaned mounted on the surface cleaning head, wherein the means for jetting fluid is connected to the outlet of the high pressure fluid jetting pump by a high pressure fluid line, and wherein the surface cleaning head further includes a means for suctioning any contaminants on the surface and any associated fluid, wherein the means for suctioning is mounted on the surface cleaning head;

a contaminated fluid storage tank mounted on the portable base including a top, an intake port and a discharge port wherein the intake port of the contaminated fluid storage tank is connected to the means for suctioning by a vacuum line;

a vacuum pump mounted on the portable base having a suction port connected through the top to an interior of the contaminated fluid storage tank by a vacuum suction line;

a contaminated fluid pump mounted on the portable base having an inlet and an outlet wherein the inlet is connected to the discharge port of the contaminated fluid storage tank by an input line; and a filtration system for filtering a contaminated fluid including at least two filters mounted on the portable base wherein an upstream side of the filtration system is connected to the outlet of the contaminated fluid pump by a contaminated fluid pump discharge line and a downstream side of the filtration system is connected to the return port of the uncontaminated fluid storage tank by a clean fluid return line.

2. The closed-loop pressure cleaning system according to claim 1 wherein the filtration system includes a means for removing hydrocarbons from the contaminated fluid.

3. The closed-loop pressure cleaning system according to claim 2 wherein said means for removing hydrocarbons comprises a means for feeding microorganisms into the contaminated fluid.

4. The closed-loop pressure cleaning system according to claim 2 wherein said means for removing hydrocarbons comprises a peat filter.

5. The closed-loop pressure cleaning system according to claim 4 wherein said peat filter included an activated carbon additive.

6. The closed-loop pressure cleaning system according to claim 4 further including a clean fluid filter mounted in the clean fluid return line.

7. The closed-loop pressure cleaning system according to claim 1 wherein the surface cleaning head is portable, independent of the portable base.

8. The closed-loop pressure cleaning system according to claim 1 wherein the high pressure fluid jetting pump is capable of discharging fluid at a pressure greater than 5,000 PSIG.

9. The closed-loop pressure cleaning system according to claim 1 wherein the filtration system further includes a plurality of filters operated in parallel.

10. The closed-loop pressure cleaning system according to claim 1 wherein the means for jetting fluid comprises at least one propeller having at least one pressure jet mounted on the propeller.

11. The closed-loop pressure cleaning system according to claim 1 wherein the contaminated fluid storage tank includes a clean-out opening and a level sight gauge.

12. A closed-loop pressure cleaning system for cleaning a surface, comprising:

a portable base;

an uncontaminated fluid storage tank mounted on the portable base wherein the uncontaminated fluid storage tank includes a return port and a discharge port;

a high pressure fluid jetting pump mounted on the portable base and having an inlet and an outlet wherein the inlet is connected by a clean water line to the discharge port of the uncontaminated fluid storage tank;

a surface cleaning head including a means for jetting fluid against the surface to be cleaned mounted on the surface cleaning head, wherein the means for jetting fluid is connected to the outlet of the high pressure fluid jetting pump by a high pressure fluid line, and wherein the surface cleaning head further includes a means for suctioning any contaminants on the surface and any associated fluid, wherein the means for suctioning is mounted on the surface cleaning head;

a contaminated fluid storage tank mounted on the portable base including a top, an intake port and a discharge pen wherein the intake pen of the contaminated fluid storage tank is connected to the means for suctioning by a vacuum line;

a vacuum pump mounted on the portable base having a suction pen connected through the top to an interior of the contaminated fluid storage tank by a vacuum suction line;

a contaminated fluid pump mounted on the portable base having an inlet and an outlet wherein the inlet is connected to the discharge port of the contaminated fluid storage tank by an input line; and a filtration system for filtering a contaminated fluid including at least two filters wherein one of said filters includes a means for removing hydrocarbons from the contaminated fluid mounted on the portable base wherein an upstream side of the filtration system is connected to the outlet of the contaminated fluid pump by a contaminated fluid pump discharge line and a downstream side of the filtration system is connected to the return port of the uncontaminated fluid storage tank by a clean fluid return line.

13. The closed-loop pressure cleaning system according to claim 12 wherein said means for removing hydrocarbons comprises a means for feeding microorganisms into the contaminated fluid.

14. The closed-loop pressure cleaning system according to claim 12 wherein said means for removing hydrocarbons comprises a peat filter.

15. The closed-loop pressure cleaning system according to claim 14 wherein said peat filter includes an activated carbon additive.

16. The closed-loop pressure cleaning system according to claim 14 further including a clean fluid filter mounted in the clean fluid return line.

17. The closed-loop pressure cleaning system according to claim 12 wherein the high pressure fluid jetting pump is capable of discharging fluid at a pressure greater than 5,000 PSIG.

18. The closed-loop pressure cleaning system according to claim 12 wherein the contaminated fluid storage tank includes a clean-out opening and a level sight gauge.

19. A closed-loop pressure cleaning system for cleaning a surface, comprising:

a portable base;

an uncontaminated fluid storage tank mounted on the portable base wherein the uncontaminated fluid storage tank includes a return port and a discharge port;

a high pressure fluid jetting pump capable of discharging fluid at a pressure greater than 5,000 PSIG mounted on the portable base and having an inlet and an outlet wherein the inlet is connected by a clean water line to the discharge port of the uncontaminated fluid storage tank;

a surface cleaning head including a means for jetting fluid against the surface to be cleaned mounted on the surface cleaning head, wherein the means for jetting fluid is connected to the outlet of the high pressure fluid jetting pump by a high pressure fluid line, and wherein the surface cleaning head further includes a means for suctioning any contaminants on the surface and any associated fluid, wherein the means for suctioning is mounted on the surface cleaning head;

a contaminated fluid storage tank mounted on the portable base including a top, an intake port and a discharge port wherein the intake port of the contaminated fluid storage tank is connected to the means for suctioning by a vacuum line and wherein the contaminated fluid storage tank further includes a clean-out opening and a level sight gauge;

a vacuum pump mounted on the portable base having a suction port connected through the top to an interior of the contaminated fluid storage tank by a vacuum suction line;

a contaminated fluid pump mounted on the portable base having an inlet and an outlet wherein the inlet is connected to the discharge port of the contaminated fluid storage tank by an input line;

a filtration system for filtering a contaminated fluid including at least two filters wherein one of said filters is a peat filter mounted on the portable base wherein an upstream side of the filtration system is connected to the outlet of the contaminated fluid pump by a contaminated fluid pump discharge line and a downstream side of the filtration system is connected to the return pen of the uncontaminated fluid storage tank by a clean fluid return line; and a clean fluid filter mounted in the clean fluid return line.

* * * * *